(12) United States Patent
Hay et al.

(10) Patent No.: US 11,429,426 B2
(45) Date of Patent: Aug. 30, 2022

(54) INTERRUPT CONTROLLER

(71) Applicant: Arm Limited, Cambridge (GB)

(72) Inventors: Timothy Nicholas Hay, Cambridge (GB); Martin Weidmann, Haverhill (GB); Michael Alexander Kennedy, Cambridge (GB); Andrew John Turner, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/056,896

(22) PCT Filed: May 1, 2019

(86) PCT No.: PCT/GB2019/051211
§ 371 (c)(1),
(2) Date: Nov. 19, 2020

(87) PCT Pub. No.: WO2019/224515
PCT Pub. Date: Nov. 28, 2019

(65) Prior Publication Data
US 2021/0271512 A1 Sep. 2, 2021

(30) Foreign Application Priority Data

May 24, 2018 (GB) .................................. 1808587

(51) Int. Cl.
*G06F 9/48* (2006.01)
*G06F 9/455* (2018.01)
(Continued)

(52) U.S. Cl.
CPC ........ *G06F 9/4812* (2013.01); *G06F 9/45533* (2013.01); *G06F 9/522* (2013.01); *G06F 9/542* (2013.01); *G06F 2009/45591* (2013.01)

(58) Field of Classification Search
CPC .... G06F 9/4812; G06F 9/45533; G06F 9/522; G06F 9/542; G06F 2009/45591
See application file for complete search history.

(56) References Cited

U.S. PATENT DOCUMENTS 5,717,932 A * 2/1998 Szczepanek ............ G06F 13/24
710/260
5,819,112 A * 10/1998 Kusters .................... G06F 13/24
710/36

(Continued)

OTHER PUBLICATIONS

International Search Report and Written Opinion of the ISA for PCT/GB2019/051211 dated Jul. 9, 2019, 12 pages.

(Continued)

*Primary Examiner* — Henry Tsai
*Assistant Examiner* — John B Roche
(74) *Attorney, Agent, or Firm* — Nixon & Vanderhye P.C.

(57) ABSTRACT

An interrupt controller comprises issue circuitry to issue interrupt requests to a processing element and control circuitry to detect presence of a race condition in association with at least one pending interrupt request to be issued, and to set a barrier indicator when the race condition has been resolved. In response to the race condition being present, the issue circuitry is configured to select one of the at least one pending interrupt requests, to issue to the processing element the selected pending interrupt request followed by a dummy request over a path that ensures that the processing element receives the selected pending interrupt request prior to receiving the dummy request. On receiving an acknowledgement indicating that the processing element has received the dummy request, the control circuitry is then configured to set the barrier indicator.

15 Claims, 8 Drawing Sheets

(51) Int. Cl.
    *G06F 9/52*     (2006.01)
    *G06F 9/54*     (2006.01)

(56) References Cited

U.S. PATENT DOCUMENTS

| | | | | |
|---|---|---|---|---|
| 5,848,318 A | * | 12/1998 | Okimoto | G06F 3/1203 |
| | | | | 399/8 |
| 2005/0080965 A1 | * | 4/2005 | Bennett | G06F 9/4812 |
| | | | | 710/200 |
| 2016/0124771 A1 | * | 5/2016 | Yu | G06F 9/4825 |
| | | | | 710/267 |

OTHER PUBLICATIONS

Combined Search and Examination Report for GB1808587.8 dated Nov. 30, 2018, 5 pages.

* cited by examiner

I.C. Causing
Resident To Switch
To Guest OS 0

| | Resident Guest O.S. | Valid | IC Check Complete | |
|---|---|---|---|---|
| IC issues doorbell request | X | X | X | ① |
| Core Processes doorbell request | X→0 | X→1 | X→1 | ② |
| IC issues interrupt request + dummy request | 0 | 1 | 1 | ③ |
| IC receives ACK of dummy request | 0 | 1 | 1→0 | ④ |

1 = Valid   1 = No
0 = Invalid   0 = Yes time →

FIG. 6A

Hypervisor Causing
Resident To Switch
FROM OS0 → OS1

|  | Resident Guest O.S. | Valid | IC Check Complete |  |
|---|---|---|---|---|
| Guest O.S.0 Executing | 0 | 1 | 0 | ① |
| Hypervisor To Change Guest O.S. | 0 | 1→0 | 0→1 | ② |
| I.C. Completes Checks | 0 | 0 | 1→0 | ③ |
| Hypervisor Sets New Guest O.S.1 | 0→1 | 0→1 | 0→1 | ④ |
| I.C. Completes Search For Requests For O.S.1 | 1 | 1 | 1→0 | ⑤ |
|  |  | 1 = Valid<br>0 = Invalid | 1 = No<br>0 = Yes |  | time →

FIG. 6B

INTERRUPT CONTROLLER

This application is the U.S. national phase of International Application No. PCT/GB2019/051211 filed May 1, 2019 which designated the U.S. and claims priority to GB Patent Application No. 1808587.8 filed May 24, 2018, the entire contents of each of which are hereby incorporated by reference.

The present technique relates to data processing. More particularly, the present technique relates to interrupt controllers.

An interrupt controller may be provided to issue interrupt requests to a processing element.

In one example, the present technique provides an interrupt controller comprising: issue circuitry to issue interrupt requests to a processing element; and control circuitry to detect presence of a race condition in association with at least one pending interrupt request to be issued, and to set a barrier indicator when the race condition has been resolved; wherein in response to the race condition being present, the issue circuitry is configured to select one of the at least one pending interrupt request, to issue to the processing element the selected pending interrupt request followed by a dummy request over a path that ensures that the processing element receives the selected pending interrupt request prior to receiving the dummy request, and to receive an acknowledgement indicating that the processing element has received the dummy request; and in response to the acknowledgement the control circuitry is configured to set the barrier indicator.

In another example, the present technique provides an interrupt controller comprising: issue means for issuing interrupt requests to a processing element; and control means for detecting presence of a race condition in association with at least one pending interrupt request to be issued, and to set a barrier indicator when the race condition has been resolved; wherein in response to the race condition being present, the issue means is configured to select one of the at least one pending interrupt request, to issue to the processing element the selected pending interrupt request followed by a dummy request over a path that ensures that the processing element receives the selected pending interrupt request prior to receiving the dummy request, and to receive an acknowledgement indicating that the processing element has received the dummy request; and in response to the acknowledgement the control means is configured to set the barrier indicator.

In another example, the present technique provides a method for issuing interrupt requests to a processing element comprising: detecting a race condition in association with at least one pending interrupt request to be issued; selecting, in response to the race condition being present, one of the at least one pending interrupt request; issuing the selected pending interrupt request followed by a dummy request to the processing element over a path that ensures that the processing element receives the selected pending interrupt request prior to receiving the dummy request; receiving an acknowledgement indicating that the processing element has received the dummy request; and setting a barrier indicator in response to the acknowledgement to indicate that the race condition has been resolved.

The present technique will be described further, by way of illustration only, with reference to examples thereof as illustrated in the accompanying drawings, in which:

FIG. 6A illustrates a series of bit-field transitions that occur in the residency register when an interrupt controller according to an example of the present technique instigates a switch from one guest operating system to a target guest operating system;

FIG. 6B illustrates another series of bit-field transition that may occur when a hypervisor of a processing element switches from one guest operating system to another guest operating system.

Figure 1:
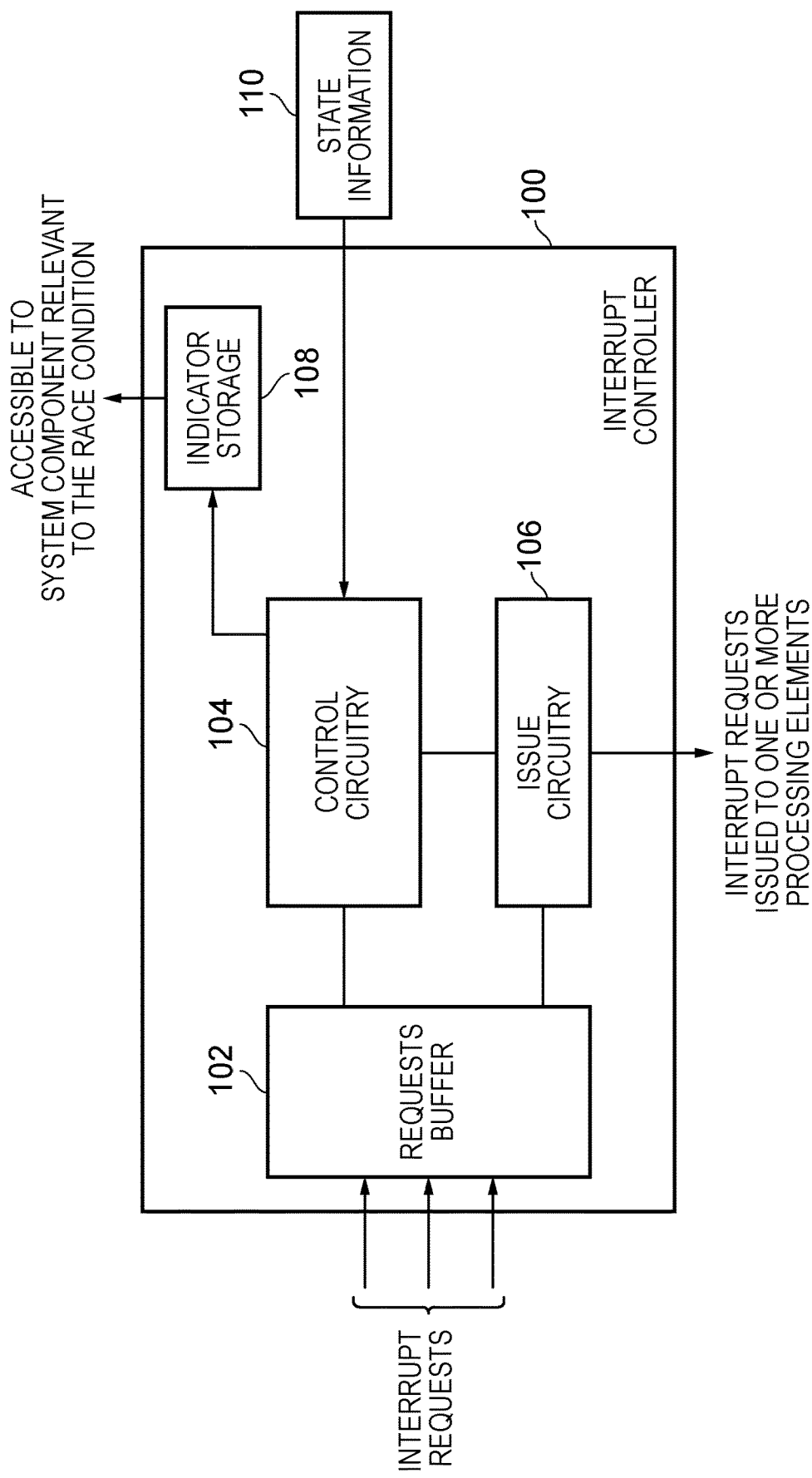
FIG. 1 illustrates one example of an interrupt controller according to the present technique.

At least one example described herein provides an interrupt controller comprising: issue circuitry to issue interrupt requests to a processing element; and control circuitry to detect presence of a race condition in association with at least one pending interrupt request to be issued, and to set a barrier indicator when the race condition has been resolved; wherein in response to the race condition being present, the issue circuitry is configured to select one of the at least one pending interrupt request, to issue to the processing element the selected pending interrupt request followed by a dummy request over a path that ensures that the processing element receives the selected pending interrupt request prior to receiving the dummy request, and to receive an acknowledgement indicating that the processing element has received the dummy request; and in response to the acknowledgement the control circuitry is configured to set the barrier indicator.

It may be desirable in some situations to seek to ensure that certain processing events within a processing element do not occur until after a pending interrupt request has been received by that processing element. For example, following the emergence of an interrupt request at an interrupt controller, various processing events may occur which inhibit or delay processing of the interrupt request if they occur before that interrupt request is delivered to the relevant processing element. The present technique recognises that issuing a dummy request following a selected interrupt request provides an efficient way to selectively determine when a particular interrupt request has arrived at its destination. The barrier indicator can then be set on this basis such that any processing event that would have otherwise inhibited or delayed processing of the interrupt request can be delayed until the barrier indicator has been set.

In known systems, when an interrupt controller issues an interrupt request to a processing element, that processing element may not be configured to acknowledge the interrupt request at the time it is received by the processing element. For instance, it can often be the case that, to the extent any acknowledgement is issued, it is only issued after the processing element has at least begun handling the interrupt request, and hence the timing of any such acknowledgement can vary quite significantly relative to the timing at which the interrupt request was received. This hence makes it difficult for an interrupt controller to effectively infer when an interrupt request has been received by a processing element.

However, it would be inappropriate to add as an additional constraint a requirement that the processing element returns an acknowledgement to confirm receipt of each and every interrupt request received from an interrupt controller, since for many of the interrupt requests there is no requirement for the interrupt controller to know when the interrupt request has been received, and as such the processing element may waste time and processing power by acknowledging receipt of all interrupt requests. This would also increase traffic between the interrupt controller and the processing element, reducing bandwidth, and increase latency which is undesireable for high priority interrupts and applications.

However, the inventors noted that it was possible to send a dummy request to a processing element that would cause an immediate acknowledgement of that dummy request. By arranging for issuance of the selected pending interrupt request to be immediately followed by a dummy request, the acknowledgement received for the dummy request can be used to infer receipt of the selected pending interrupt request, and hence provide an accurate indication of the time at which the selected pending interrupt request is received. By setting the barrier indicator at that point, it is possible to insert a barrier between receipt of an interrupt request of interest, and the performance of certain processing events, so as to ensure that such a processing event does not occur until after the interrupt request of interest has been received by the processing element.

In some examples, the race condition arises when an operation of a component of a system in which the interrupt controller is employed is desired to be performed once the processing element has received the selected pending interrupt request. Thus a barrier can effectively be inserted between receipt of the interrupt request by the processing element and the operation of the component, such that the operation is not performed until the interrupt request has been received. Implementation of a barrier in this way can be useful in a variety of situations, examples of which will be described subsequently. In any case, the present technique is advantageous in any situation where the operation could have an adverse effect on processing of the interrupt request if it is performed before the interrupt request is received, and by using the techniques described herein it can be ensured that the operation is not to be performed until the interrupt request has at least been received by the processing element.

In some examples, the control circuitry comprises monitoring circuitry to monitor system state information to determine whether the race condition is present. Correct processing of the selected pending interrupt request may be dependent on operations of the processing element as well as the operations performed by other elements in the system. Therefore, arranging the interrupt controller to monitor system state allows barriers to be set for a wide variety of situations. This is counter intuitive as one would typically expect the selection, issue and processing of an interrupt request to be a relatively isolated series of operations, independent to other events in a system. However, the present technique recognises that this may not always be the case. For example, the process of selecting and issuing an interrupt request can be relatively long (due for example to the time taken to search through a record of pending interrupt requests in order to determine the next one to be selected), and during this time other events may occur which unfavourably interfere with processing of a selected interrupt request.

Purely by way of one specific example, the system state information may indicate that a target operating system for a particular interrupt request is not resident on a CPU, and it is hence not currently in a position to handle the interrupt request. As another example, the state information may be indicative that a gating controller wishes to clock gate a path to the processing element, and hence it is desirable that the interrupt request is received by the processing element before any gating occurs.

In some examples, the control circuitry determines whether the race condition is present based on the system state information and the at least one pending interrupt request. Therefore, the at least one pending interrupt request can also be considered as a source of the race condition in addition to the system state information. This is appropriate in a variety of cases, for example where steps taken to place the processing element in a state where it can receive the at least one pending interrupt request can cause initiation of processing that may result in the earlier-mentioned operation of the component being performed. The present technique recognises that preliminary operations performed to enable the processing element to handle the pending interrupt request being selected can have an adverse impact on processing of the selected pending interrupt request if not controlled correctly, and the above described techniques can be used to mitigate that possibility by inserting a barrier such that performance of any operation that could result in the above mentioned adverse impact is deferred until the selected interrupt request has been received by the processing element.

In some examples, the interrupt controller further comprises indicator storage to store the barrier indicator, such that setting of the barrier indicator causes the component to be notified that the race condition is resolved. Thus the interrupt controller need not explicitly indicate to the component that the race condition is resolved and that the operation can now be performed. Instead, simply indicating in the indicator storage is sufficient, which can reduce processing required of the interrupt controller.

In some examples, the component of the system for which one or more operations are to be deferred until the selected pending interrupt request has been received, is actually the processing element that is to receive the selected pending interrupt request.

In some examples, the operation of the processing element that it is desired to defer comprises execution of one or more program instructions to perform associated data processing operations required following receipt of the given interrupt request. The present technique recognises that the manner in which the interrupt request is handled by the processing element is dependent on whether the interrupt request is received or not when the data processing operations are performed, and for the interrupt request to be handled efficiently and/or correctly, it is be desirable for the data processing operations to only be performed once the interrupt request has been received.

In some examples the processing element is configured to employ a plurality of operating systems under control of a hypervisor, at any one point in time one of those operating systems being a resident operating system for the processing element. The race condition may then occur when a target operating system for the at least one pending interrupt request is other than the resident operating system, where the one or more instructions are to be executed under the control of the target operating system. The control circuitry may be configured, in the presence of the race condition, to send a switch request to the processing element to cause the hypervisor to make the target operating system the resident operating system. The cost of switching between operating systems is typically relatively high. Therefore, if an interrupt request targets a target operating system and a switch needs to be performed to that operating system in order for the interrupt request to be processed, then it is desirable that the interrupt request is actually processed following the switch. However, the time between the interrupt controller instigating the switch by sending the switch request, and the interrupt controller issuing the selected pending interrupt request can be relatively long due to the time taken to search through pending interrupts request to locate the selected pending interrupt request. If not controlled, the processing element may complete execution of the one or more instructions under control of the target operating system, and decide to switch to another operating system due to the pending interrupt request not having been received by the time those instructions have been executed. As a consequence, when the selected interrupt request is available to be processed by the processing element, it cannot be processed as the target operating system is no longer resident. Therefore, the present technique is particularly well suited to this arrangement, as the execution of one or more program instructions by the processing element can be delayed until the interrupt controller determines that the interrupt request has been received by the processing element.

In some examples, the interrupt controller is configured to receive a response indicator indicating that the hypervisor has made the target operating system the resident operating system, and to issue the selected pending interrupt request followed by the dummy request after receipt of the response indicator. This provides a simple and effective mechanism for enabling the selected pending interrupt request to be issued when it is known that the operating system that it targets is resident on the processing element, avoiding the possibility of the selected pending interrupt request being sent too soon, but also avoiding any undue delay before the interrupt controller knows it is safe to select and issue the pending interrupt request.

In some examples, the interrupt controller is configured to set the barrier indicator in response to the acknowledgement to indicate that execution of the one or more program instructions by the target operating system may be performed. This provides a simple and effective mechanism for ensuring that execution of the one or more program instructions which could otherwise inhibit proper processing of the selected pending interrupt request is delayed until it is confirmed that the processing element has received the selected pending interrupt request.

In some examples, the interrupt controller further comprises a residency register accessible to the processing element, wherein the processing element is arranged to set the response indicator within the residency register, and the control circuitry is configured to monitor the residency register for the response indicator. The use of a register in this manner provides a simple and straightforward way for the interrupt controller to be advised when the response indicator has been set by the processing element.

The path between the interrupt controller and the processing element, from which the various requests are issued, can take a variety of forms. However, in some examples, the path ensures that the processing element receives the selected pending interrupt request prior to receiving the dummy request by transmitting requests in-order. There are a number of ways in which the in-order handling can be managed. For example, one or more FIFO (first-in-first-out) buffer structures may be included in association with the path to ensure that requests are propagated in order.

The dummy request used in the above described techniques can take a variety of forms, provided it is of a form that causes an acknowledgement to be issued to the interrupt controller upon receipt by the processing element. In some examples, the dummy request may be a clear interrupt request, which would typically be issued by the interrupt controller when it wishes to indicate that an interrupt request already issued no longer needs to be performed. Such a clear interrupt request can be arranged to be acknowledged upon receipt. The inventors took advantage of this fact by determining that a clear interrupt request could be used as the dummy request, by specifying a spurious identifier for the interrupt request to be cleared. Due to the use of a spurious ID, this will mean that no interrupt requests will be cleared and hence the dummy request will not have any unwanted effect on the processing element. Furthermore, this is a request format already available to the interrupt controller, and one that the processing element is arranged to acknowledge, and hence it can be ensured that the interrupt controller will be advised of receipt of the dummy request propagated immediately following the selected pending interrupt request of interest, thereby giving the interrupt controller an approximate indication of when the selected pending interrupt request was received.

Some particular examples of the present technique will now be described with reference to the figures.

FIG. 1 shows one example of an interrupt controller 100 according to the present technique. The interrupt controller 100 comprises an interrupt request buffer 102 configured to receive, queue, and prioritise interrupt requests. The interrupt requests may emerge from a number of sources. For example, the interrupt controller 100 may be arranged in a system that comprises a number of peripheral devices, and a number of processing elements to execute program instructions in response to inputs from the peripheral devices. However the processing demands of the peripheral devices may at times exceed the processing capabilities of the processing elements. Therefore, the processing elements are adapted to switch between processing of program instructions corresponding to different ones of the peripheral devices such that they are effectively shared between the peripheral devices. This sharing of processing elements by the peripheral devices allows the processing demands of the peripheral devices to be met in a manner that requires less overall processing power. So that any given peripheral device is responsive when operated, rather than having to wait for the processing elements to complete other tasks the interrupt controller 100 is arranged to handle interrupt requests for the system so that more urgent processing can be prioritised over less urgent processing. A prioritisation scheme can be implemented by the control circuitry 104 to determine which interrupt requests pending in the request buffer 102 should be issued to the processing elements in advance of other pending interrupt requests. When the control circuitry 104 selects an interrupt request from the request buffer 102, it indicates its selection to the issue circuitry 106 which subsequently issues the selected interrupt request from the request buffer 102 to a chosen processing element.

Whilst in the above example, interrupt requests issued by peripheral devices are considered, it will also be appreciated that in many systems there can be other sources of interrupt requests in addition to peripheral devices, and all of those various interrupt requests need to be prioritised and issued by the interrupt controller 100.

In some cases, a race condition may arise where it is desirable that a system component (for example one of the processing elements) only performs a particular operation once a pending interrupt request in the request buffer 102 has been received by the processing element to which that pending interrupt request was issued, or in other words, that a barrier is inserted between receipt of a pending interrupt request by the processing element, and certain processing operations performed by the system component (which in one example is the same processing element that received the pending interrupt request). For example, the processing element may be due to perform a switch from one process to another. If the pending interrupt request relates to the earlier process, it is desirable that the interrupt request is received by the processing element before the processing element is allowed to perform the switch. As another example, it may be required to switch the processing element from a first process to a second process, so that the second process can then handle the interrupt request. However, if the second process begins too quickly, it may reach a point where it stalls waiting for the interrupt request, and in that instance the processing element may decide to switch from the second process to a further process. This would significantly impact efficiency, since when the interrupt request was subsequently received by the processing element, it would no longer be able to be processed, and would need to be recalled by the interrupt controller and scheduled for a subsequent time.

To seek to address this issue, the interrupt controller 100 further comprises indicator storage 108, which is accessible to the system component related to the race condition (which in the above case is the processing element itself), and can be used to indicate to the system component when the operation may be performed. This indication is only set when it is confirmed that the processing element has actually received the interrupt request. However, some systems may not be arranged with processing elements that acknowledge receipt of interrupt requests by default, since this could significantly increase traffic between the processing elements and the interrupt controller. Therefore, to facilitate selective acknowledgement of interrupt requests, the interrupt controller 100 is configured to transmit a dummy request following particular interrupt requests, which the processing elements is arranged to acknowledge. For example, the dummy request may be a clear interrupt request with a spurious ID value corresponding to a non-existent interrupt. A clear interrupt request is arranged to be acknowledged upon receipt, but as the processing element is unable to clear the non-existent interrupt on account of the erroneous ID, no action needs to be taken by the processing element. Since the dummy request was issued following the selected pending interrupt request of interest, the acknowledgement for the receipt of the dummy request can be considered as inferring that the interrupt request issued prior to the dummy request has also been received. Therefore, on this basis of this acknowledgement, the interrupt controller can set the indicator in the indicator storage with the knowledge that the processing element has received the interrupt request.

The interrupt request and the subsequent dummy request are issued to the processing element via a path that ensures that the processing element receives the interrupt request prior to receiving the dummy request. There are a number of specific examples of paths that can fulfil this function. For example, the path may be a path arranged to transmit requests according to a first-in first-out protocol. Alternatively, the path may be an in-order path, within which reordering of requests being forbidden.

The control circuitry may also have access to state information 110, that is used to determine the presence of the race condition. The state information referred to can take a variety of forms dependent on the type of system in which the interrupt controller is placed. Purely by way of one specific example, the system state information may indicate that a target operating system for a particular interrupt request is not resident on a CPU, and it is hence not currently in a position to handle the interrupt request. As another example, the state information may be indicative that a gating controller wishes to clock gate a path to the processing element, and hence it is desirable that the interrupt request is received by the processing element before any gating occurs.

Figure 2:
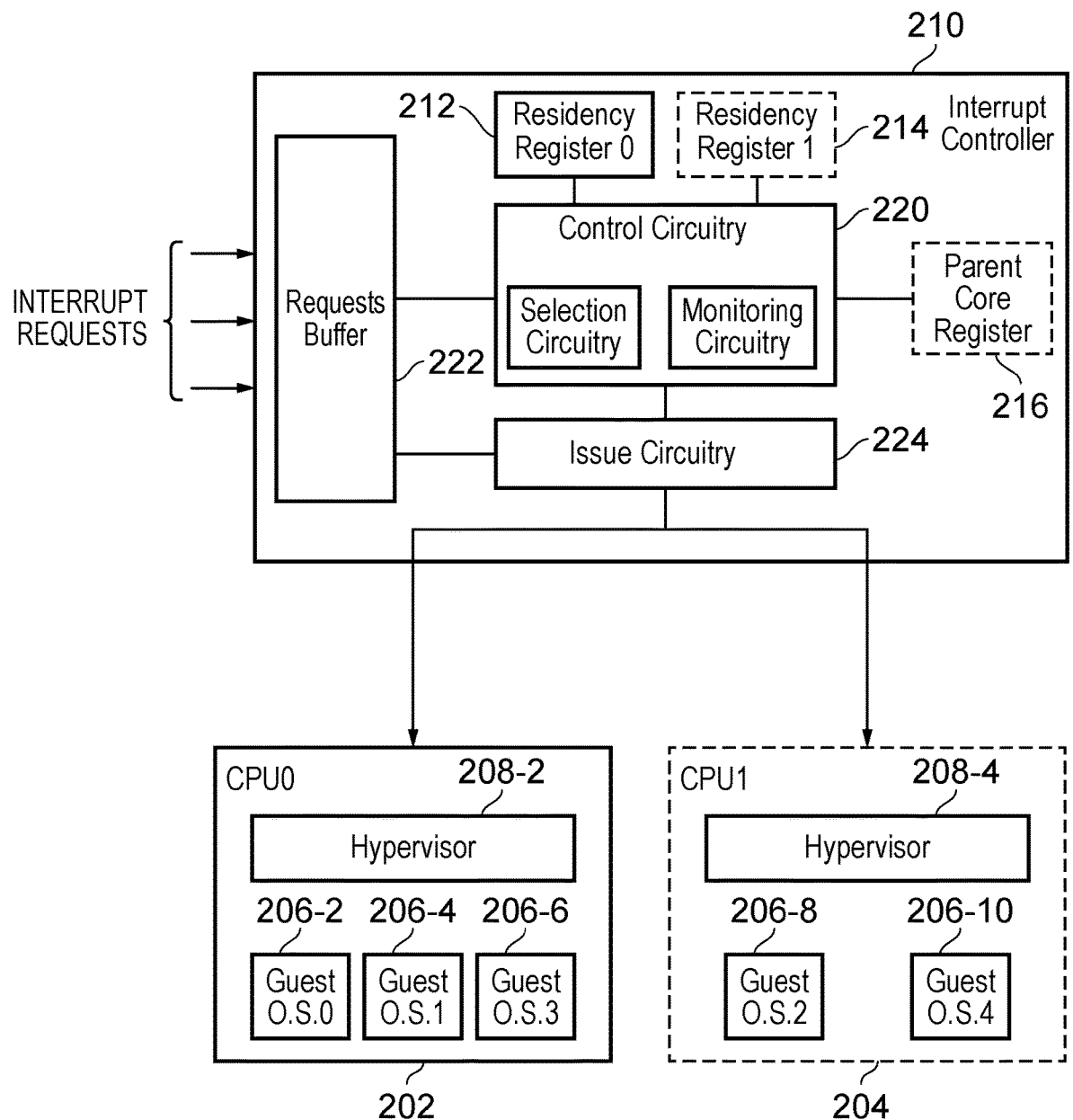
FIG. 2 illustrates another example of an interrupt controller according to the present technique arranged to handle interrupt requests for a processing element that employs guest operating systems under control of a hypervisor.

FIG. 2 shows an example of a system 200 including an interrupt controller 210 according to the present technique. The interrupt controller 210 is similar to that of FIG. 1 in that it is arranged to receive interrupt requests from external sources, and issue the interrupt requests to processing elements, but is specifically configured to implement the present technique in the guest operating system (OS) environment of the system 200. For example, as can be seen each of the CPUs is capable of employing a number of guest operating systems 206 (in the illustrated example, the guest operating systems 206-2, 206-4 and 206-6 in CPU0 202, and the guest operating systems 206-8 and 206-10 in CPU1 204) under control of a hypervisor 208 (in the illustrated example, hypervisor 208-2 in CPU0 202 and hypervisor 208-4 in CPU1 204). Some of the interrupt requests received by the interrupt controller may be targeted at particular guest operating systems. The hypervisor 208 of each CPU is provided to control the guest operating systems, by allocating processing resources of the CPU to a resident guest operating system, whilst the other guest operating systems are set as non-resident and are hence inactive. For example, CPU0 202 may initially be running guest OS0 206-2, but the hypervisor 208-2 may subsequently decide to switch from guest OS0 206-2 to guest OS3 206-6 to allow execution of instructions by guest OS3. Certain interrupt requests received by the interrupt controller 210 may be targeted at particular guest OS s, and hence it is necessary for the relevant guest operating system to be resident before such an interrupt request can be processed.

At a general level, interrupt requests may be defined as either physical interrupt requests, which are targeted at a particular CPU, or virtual interrupt requests, which are targeted at a particular an operating system. For example, the interrupt controller may receive a virtual interrupt request from a peripheral device targeting guest OS2 206-8. The control circuitry 220 may then check the parent core register 216 to determine which core is parent to guest OS2, which in this case is CPU1 204. The control circuitry 220 then checks the corresponding residency register 212, 214, in this case residency register1 214, to determine whether guest OS2 206-8 is currently resident or not. If not, the virtual interrupt request cannot be issued because guest OS2 206-8 is inactive and not currently executing. Therefore, the control circuitry first issues a physical interrupt request to CPU1 204 which indicates to CPU1 204 that it is to switch to make guest OS2 206-8 resident. Only once this switch has been performed is the originally received virtual interrupt request issued to CPU1 204.

Whilst in FIG. 2 each guest OS is shown as being associated with a particular CPU, guest OSs can be migrated between one CPU and another, in which event the contents of the parent core register 216 would be updated accordingly.

It will be appreciated that in a modified example of the system 200, CPU1 204 may not be included, and as such the present technique can be applied in a system comprising only a single CPU. Furthermore, when CPU1 204 is not included, there is also no need for the parent core register 216 or residency register 1 214.

Figure 3:
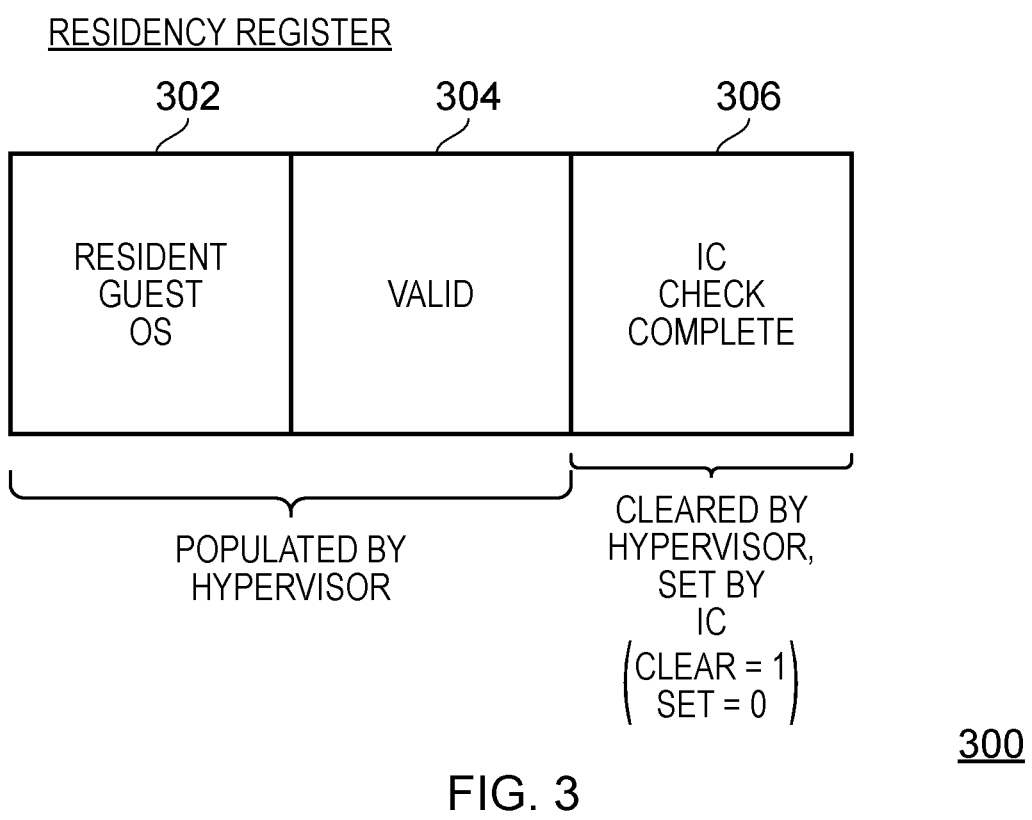
FIG. 3 shows the fields of a residency register of an interrupt controller according to an example of the present technique.

FIG. 3 shows an example of a residency register 300 in more detail. As can be seen, a resident guest OS field 302 shows which guest operating system is currently resident on the corresponding CPU. This field is controlled by the hypervisor of the CPU, and is updated when a switch of guest OS occurs. The hypervisor also has control of a valid field 304. This field is set when the guest OS is both resident, and executing program instructions on the core, and is indicative that the guest OS is effectively busy. Once processing of any program instructions to be executed by the resident guest OS is complete, the hypervisor can clear the valid field 304 to indicate that the guest OS is no longer busy, and that a switch to another guest OS may be performed. However, the switch may not actually be performed until a switch initiating event occurs, and until this time, the current guest OS may idly remain resident on the CPU. An interrupt controller check complete field 306 is also provided, and is controlled by the interrupt controller 210 rather than the hypervisor. This field is used to indicate when processing by the resident guest OS can be performed, having regard to a check performed by the interrupt controller 210 according to the present technique. Processing by a given guest OS cannot be performed unless it is indicated as resident, valid, and that the corresponding interrupt controller checks are complete in the residency register.

Figure 4:
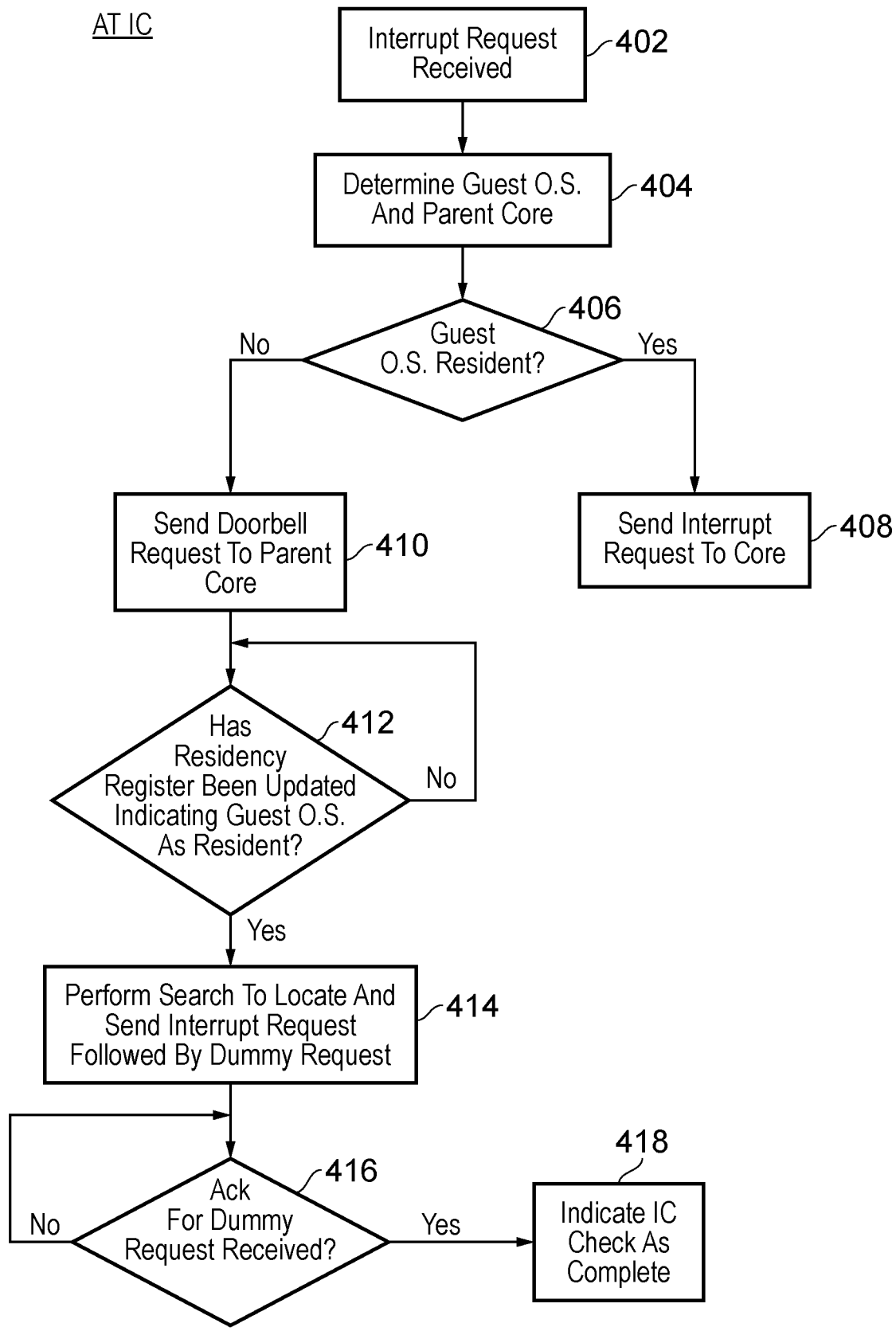
FIG. 4 shows a method for handling interrupt requests according to an example of the present technique.

FIG. 4 shows an example of a method for handling an interrupt request in the guest OS environment of FIG. 2 according to the present technique. At step 402 a virtual interrupt request that targets a particular guest OS is received from an external source, such as a peripheral device, or software for example. At step 404, the interrupt controller 210 determines the guest OS targeted by the interrupt request, and checks the parent core register 216 to determine which CPU is the parent of the target guest OS. The control circuitry 220 then checks the residency register corresponding to the parent core to determine whether the guest OS is currently resident on the core, as shown in step 406. If this is the case, then at step 408 the interrupt request is issued to the core, and the process ends. It should be noted that the interrupt request will not necessarily be issued immediately at step 408, as the exact timing of issue will depend on its priority relative to any other pending interrupt requests.

On the other hand, if the guest OS targeted by the interrupt request is not currently resident on the parent core then the control circuitry determines that it needs to instigate a switch to the guest OS at the parent core. Hence, this time, the received interrupt request is added to a pending queue within the request buffer 222. As a result of this determination, the monitoring circuitry detects the presence of the race condition, since there is a pending virtual interrupt request that targets a guest OS which is not resident. To instigate the switch to the guest OS, in step 410 the interrupt controller 210 issues a physical interrupt request (referred to herein as a doorbell request) to the parent core, indicating that the hypervisor of the core should make the specified guest OS resident. It should be noted that the doorbell request will not always be issued immediately, as the time at which it is issued will depend on its priority relative to other physical pending interrupt requests.

Once the doorbell request has been issued, the interrupt controller 210 waits until the residency register corresponding to the parent core has been updated to indicate that the guest OS has been made resident. Specifically, the control circuitry monitors the resident guest OS field 302 of the residency register until it has been updated to match the guest OS that is the target of the virtual interrupt request, as shown in step 412. When the residency register has been updated to indicate that the target guest OS is the resident, and to indicate that that guest OS is valid, then at step 414 the control circuitry performs a search within the requests buffer 222 to locate any pending virtual interrupt requests that target the guest OS. In many cases, the pending interrupt request found at step 414 will be the same interrupt request originally received in step 402. However, in some cases, the originally received virtual interrupt request may have been recalled, and replaced with a different virtual interrupt request. Alternatively, the originally received interrupt request may still be pending in the request buffer, but it may be that a higher priority interrupt request has now also been added to the request buffer. In any case, when a pending interrupt request has been located that targets the guest OS that is now resident, the control circuitry 220 causes the issue circuitry 224 to send the pending interrupt request followed by a dummy request to the parent core at step 414. The interrupt controller 210 then awaits an acknowledgement signal (ACK) for the dummy request at step 416. When the ACK is received, the interrupt controller 210 can confirm that the parent core has received the interrupt request, and sets the IC check field as complete in step 418 to indicate that the parent core may now begin processing program instructions. By delaying setting of the IC check complete field until this point, it can be ensured that the parent core does not begin performing data processing operations until the core has received the virtual interrupt request that caused the switch, thereby avoiding the possibility that early performance of those operations before the interrupt request have been received may cause the CPU to switch out of the target guest OS. This reduces the likelihood of frivolous switching being performed, and since switching between guest operating systems is relatively expensive, reduces wasted processing resources.

Figure 5:
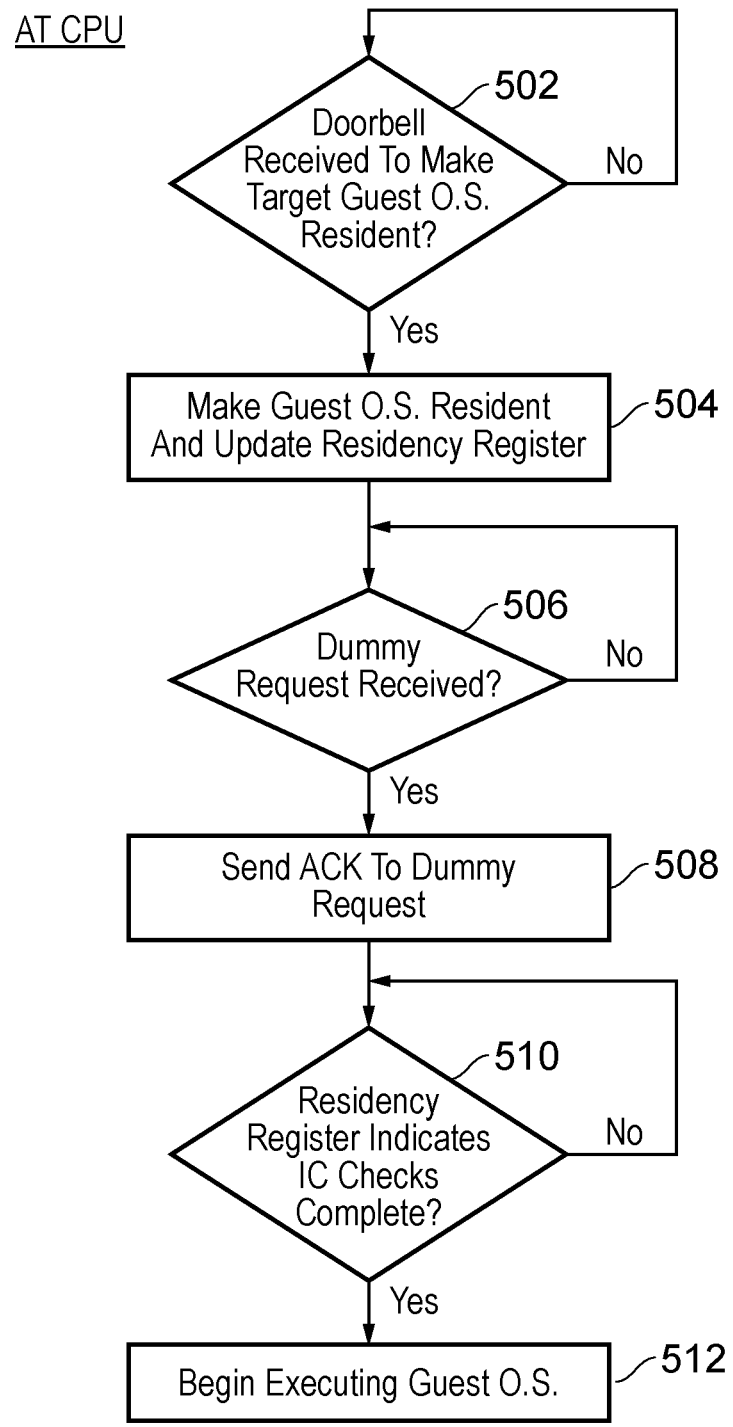
FIG. 5 shows a method performed by a processing element coupled to an interrupt controller in accordance with an example of the present technique.

FIG. 5 shows one example of processing at the CPU in response to the method of FIG. 4. At step 502 the CPU receives the physical interrupt request (doorbell request), indicating that the target guest OS should be made resident. At step 504, the CPU switches to the target OS by halting current execution by any other guest OS and preparing to execute instructions by the target guest OS. When the previous guest OS has been withdrawn and the CPU is ready to execute instructions by the target guest OS, the CPU updates the residency register to indicate that the target guest OS is resident and to identify that it is valid. The CPU also begins monitoring the residency register to determine whether the IC checks are complete at this stage. However, as an ACK to the dummy request will not yet have been received by the interrupt controller, the IC checks will not be marked as completed. At step 506, the CPU awaits the dummy request. Execution of program instructions by the target guest OS is not possible as the residency register will not yet indicate that the IC checks are complete. When the dummy request is received, the CPU sends acknowledgement of receipt to the interrupt controller in step 508. Following this, the CPU continues to monitor the residency register, waiting for the IC check complete field to be set, as shown in step 510. When this occurs, the method proceeds to step 512 where the CPU can begin executing program instructions with the target guest OS.

FIG. 6A shows an example of the transitions that occur in the residency register when an interrupt controller instigates a switch of guest OS at a given core. In the example of FIG. 6A, the switch is made to guest OS0. For the purpose of the steps being illustrated in FIG. 6A, prior to the switch of guest OS the current values in the residency register are not of particular relevance, and could be any value, as indicated by the 'X's in the first row. However, it will be appreciated that in some examples, some initial checks could be made with respect to the current values, for example to make sure that the current OS is not already the target OS of the switch, or to make sure that the current OS is marked as invalid if that is made a requirement for performing a switch. When the interrupt controller is to instigate a switch to a target guest OS, it first issues a doorbell request to the parent core of that guest OS, as described with reference to step 410 of FIG. 4. In response to the doorbell request, the core switches to the target guest OS, and updates the residency register accordingly. Specifically, the core updates the resident guest OS field to 0, indicating that the resident guest OS is guest OS0, and sets the valid bit to '1' to indicate that guest OS0 is valid, as shown in the second row. Any time any change is made to the resident guest OS field or the valid field by the core, the IC check complete field transitions to a logic one state, to indicate that the interrupt controller has yet to perform the necessary checks for processing by guest OS to be performed, as also shown in the second row. The interrupt controller determines from the change in the resident guest OS field that guest OS0 is now resident, and thus sends the virtual interrupt request followed by the dummy request, as described with reference to step 414 of FIG. 4 for example. No changes to the values in the residency register occur at this point, as shown in the third row. When the interrupt controller receives the ACK to the dummy request, it can be determined that the core has now received the virtual interrupt request, and so the interrupt controller sets the IC check complete field to '0', indicating that the checks are complete, and that the core may proceed to executing instructions under control of the guest OS0.

FIG. 6B shows an example of changes that occur in the residency register when a hypervisor of a given core causes a switch of guest OS. In the example of FIG. 6B, the switch is made from guest OS0 to guest OS1. In the first row, the resident guest OS field indicates that the current resident guest OS is guest OS0 by the value of '0'. The valid bit is also set to '1' since guest OS0 is currently executing program instructions and is effectively busy. The IC check complete field is '0' since the interrupt controller checks for guest OS0 have been completed previously.

At a later point, the hypervisor may determine that it should switch to guest OS1, for example as there may be pending tasks to be completed by guest OS1. To switch, the hypervisor first sets the valid field to '0', to indicate that while guest OS0 is resident, its residency is no longer valid, and no further operations may be performed by it, as shown in the second row. In addition, as also shown in the second row, this change in the residency register contents causes the IC check complete field to be set to '1' to indicate that the interrupt controller checks are not complete, and any change in the residency register has not yet been approved by the interrupt controller.

In the third row, the interrupt controller performs its checks, and once completed, marks the IC checks complete field as '0'. For example, the interrupt controller may check whether it has issued any interrupt requests in respect of guest OS0, but those interrupt requests have not yet been processed by the core. In that case, it may be necessary to recall those interrupt requests from the core so that they can be added back into the requests buffer 222. It may also be necessary in such an event to add another doorbell request to the pending physical interrupt requests, so that at some subsequent time the doorbell request can be issued to cause the core to switch back to guest OS 0. Alternatively, the residency register may include an additional field to record an indication that guest OS0 will be need to be made resident again when processing by OS1 is complete. In such an implementation, checking of the additional field in parallel with prioritisation of the interrupt requests in the request buffer can be performed to determine when to switch back to OS0, without an additional doorbell being necessary.

When the checks are complete, the interrupt controller sets the IC checks complete field to '0', as shown in the third row. In response to this, the hypervisor then switches to guest OS1, and indicates this by setting the resident guest OS field and the valid field as shown in the fourth row. However, once again, as there has been a change in the residency register, the IC check complete field is set to '1' as shown in the fourth row, and therefore although guest OS1 is resident, it cannot begin processing program instructions. Once the interrupt controller has completed its checks (including identifying any virtual pending interrupt requests for guest OS 1, the transmission of a selected pending interrupt request followed by the dummy request as described with reference to FIG. 4 if there is at least one pending interrupt requests for OS1, and the receipt of the acknowledgement for that dummy request) the interrupt controller sets the IC check complete field to '0' in the fifth row, and as such the guest OS 1 can proceed by executing program instructions.

Figure 7:
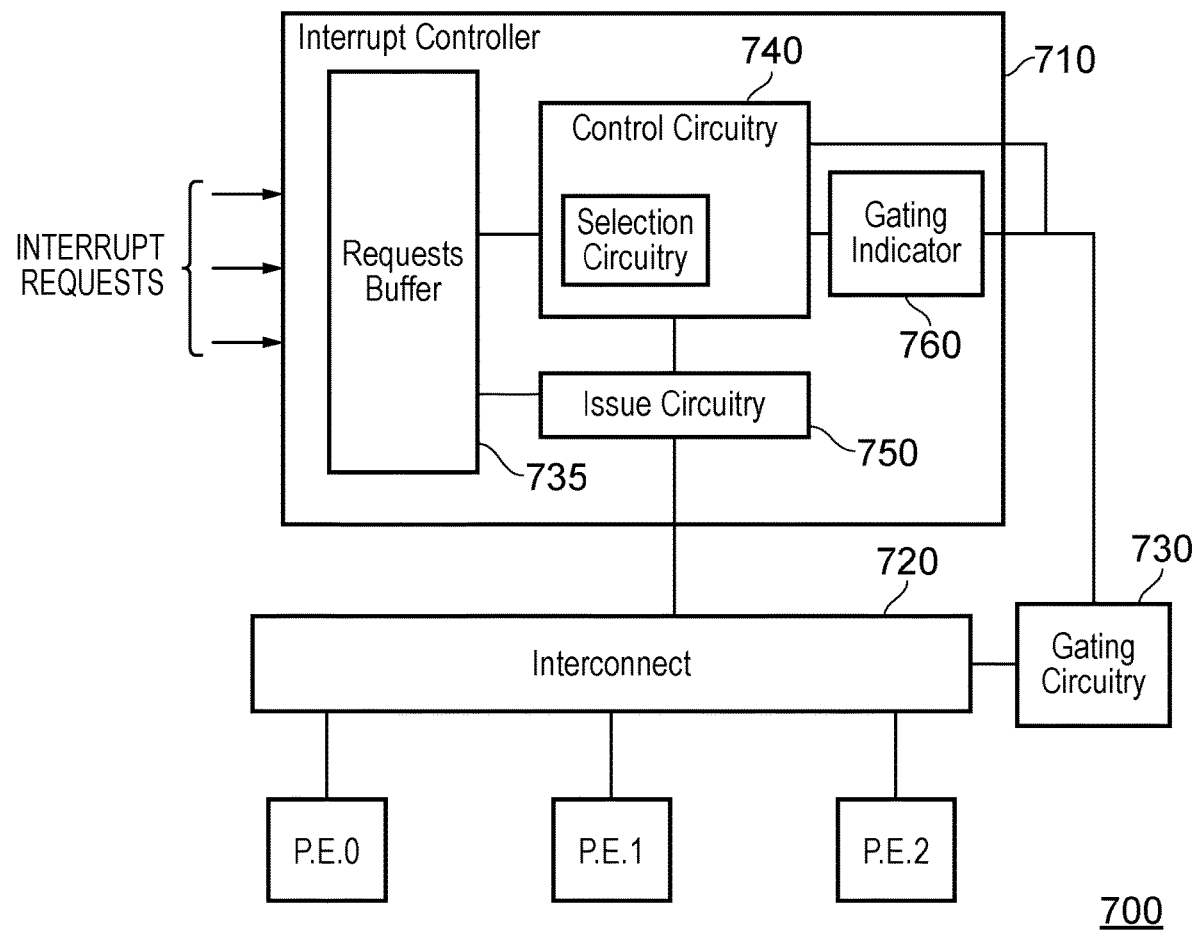
FIG. 7 shows another example of an interrupt controller according to an example of the present technique coupled to a plurality of processing elements via a gateable interconnect.

FIG. 7 shows another example of system 700 in which the present technique may be applied. In the system 700, an interrupt controller 710 is coupled to three processing elements via interconnect 720. The system 700 also includes gating circuitry 730 that is configured to clock gate elements of the interconnect when not in use in order to reduce power consumption.

A number of checks may be performed by the gating circuitry 730 to determine when it is appropriate to gate a particular path to a given processing element. However, an issue can arise if these checks indicate that gating a path to a particular processing element is appropriate whilst there is still an interrupt request in the interrupt request buffer 735 that targets that processing element. To address this issue the interrupt controller 710 is provided with control circuitry 740 to detect when the gating circuitry 730 indicates that it would like to gate a path to a particular programming element. When this is the case, the control circuitry 740 checks whether there is a pending interrupt request targeting the particular processing element in the interrupt request buffer 740, and if so, controls the issue circuitry 750 to issue that interrupt request, followed by the earlier mentioned dummy request, to the relevant processing element. Once the pending interrupt request has been issued and the acknowledgement for the dummy request indicates that it has been received by the required processing element, the control circuitry then sets a barrier indicator in the gating indicator 760 to indicate to the gating circuitry 730 that the path to that processing element may now be gated. In this way, the situation where a path to a particular processing element is gated and thus unusable, but interrupt requests targeting that processing element are still pending can be avoided. Hence, the present technique improves efficiency as it avoids a path through the interconnect being gated whilst there are still pending interrupt request that may need to be issued over that path, hence avoiding the need to ungate those paths merely to allow the interrupt request to be handled. This avoids unnecessary gating and ungating, which could incur power consumption costs but also potentially delay the handling of one or more pending interrupt requests due to the need for them to remain pending in the interrupt request buffer 740 whilst the gated path is ungated in order to allow them to be issued to the appropriate processing element.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An interrupt controller comprising:
issue circuitry to issue interrupt requests to a processing element; and
control circuitry to detect presence of a race condition in association with at least one pending interrupt request to be issued, and to set a barrier indicator when the race condition has been resolved; wherein
in response to the race condition being present, the issue circuitry is configured to select one of the at least one pending interrupt request, to issue to the processing element the selected pending interrupt request followed by a dummy request over a path that ensures that the processing element receives the selected pending interrupt request prior to receiving the dummy request, and to receive an acknowledgement indicating that the processing element has received the dummy request; and
in response to the acknowledgement the control circuitry is configured to set the barrier indicator.

2. The interrupt controller according to claim 1, wherein the race condition arises when an operation of a component of a system in which the interrupt controller is employed is desired to be performed once the processing element has received the selected pending interrupt request.

3. The interrupt controller according to claim 2, wherein the control circuitry comprises monitoring circuitry to monitor system state information to determine whether the race condition is present.

4. The interrupt controller according to claim 3, wherein the control circuitry is arranged to determine whether the race condition is present based on the system state information and the at least one pending interrupt request.

5. The interrupt controller according to claim 2, further comprising indicator storage to store the barrier indicator, such that setting of the barrier indicator causes the component to be notified that the race condition is resolved.

6. The interrupt controller according to claim 2, wherein the component of the system is the processing element.

7. The interrupt controller according to claim 2, wherein the operation of the processing element comprises execution of one or more program instructions to perform associated data processing operations required following receipt of the selected pending interrupt request.

8. The interrupt controller according to claim 7, wherein:
the processing element is configured to employ a plurality of operating systems under control of a hypervisor, at any one point in time one of said operating systems being a resident operating system for the processing element;
the race condition occurs when a target operating system for the at least one pending interrupt request is other than the resident operating system, where the one or more instructions are to be executed under the control of the target operating system; and
the control circuitry is configured, in the presence of the race condition, to send a switch request to the processing element to cause the hypervisor to make the target operating system the resident operating system.

9. The interrupt controller according to claim 8, wherein the interrupt controller is configured to receive a response indicator indicating that the hypervisor has made the target operating system the resident operating system, and to issue the selected pending interrupt request followed by the dummy request after receipt of the response indicator.

10. The interrupt controller according to claim 9, wherein the control circuitry is configured to set the barrier indicator in response to the acknowledgement to indicate that execution of the one or more program instructions by the target operating system may be performed.

11. The interrupt control according to claim 10, further comprising a residency register accessible to the processing element, wherein the processing element is arranged to set the response indicator within the residency register, and the control circuitry is configured to monitor the residency register for the response indicator.

12. The interrupt controller according to claim 1, wherein the path ensures that the processing element receives the selected pending interrupt request prior to receiving the dummy request by transmitting requests in-order.

13. The interrupt controller according to claim 1, wherein the dummy request is a clear interrupt request comprising a spurious identifier for the interrupt request to be cleared.

14. An interrupt controller comprising:
issue means for issuing interrupt requests to a processing element; and
control means for detecting presence of a race condition in association with at least one pending interrupt request to be issued, and to set a barrier indicator when the race condition has been resolved; wherein
in response to the race condition being present, the issue means is configured to select one of the at least one pending interrupt request, to issue to the processing element the selected pending interrupt request followed by a dummy request over a path that ensures that the processing element receives the selected pending interrupt request prior to receiving the dummy request, and to receive an acknowledgement indicating that the processing element has received the dummy request; and in response to the acknowledgement the control means is configured to set the barrier indicator.

15. A method for issuing interrupt requests to a processing element comprising:

- detecting using control circuitry, a race condition in association with at least one pending interrupt request to be issued;
- employing issue circuitry to select, in response to the race condition being present, one of the at least one pending interrupt request;
- issuing, from the issue circuitry, the selected pending interrupt request followed by a dummy request to the processing element over a path that ensures that the processing element receives the selected pending interrupt request prior to receiving the dummy request;
- receiving at the issue circuitry an acknowledgement indicating that the processing element has received the dummy request; and
- employing the control circuitry to set a barrier indicator in response to the acknowledgement to indicate that the race condition has been resolved.

* * * * *